United States Patent [19]

Beck

[11] 4,449,862
[45] * May 22, 1984

[54] VORTEX INJECTION METHOD AND APPARATUS

[75] Inventor: Jeffrey L. Beck, Ponca City, Okla.

[73] Assignee: Conoco Inc., Ponca City, Okla.

[ * ] Notice: The portion of the term of this patent subsequent to Oct. 18, 2000 has been disclaimed.

[21] Appl. No.: 218,857

[22] Filed: Dec. 22, 1980

[51] Int. Cl.³ .............................................. B65G 53/30
[52] U.S. Cl. ...................................... 406/93; 406/153; 406/197; 37/195
[58] Field of Search ................... 417/54, 65, 171, 194; 406/96, 93, 109, 152, 153, 197; 37/58, 195

[56] References Cited

U.S. PATENT DOCUMENTS

| | | |
|---|---|---|
| 1,856,537 | 5/1932 | Burks ................................. 417/54 |
| 3,485,534 | 12/1969 | Wanzenberg et al. .............. 406/109 |
| 3,708,239 | 1/1973 | Stable .............................. 417/171 X |
| 3,870,373 | 3/1975 | Doerr et al. ....................... 406/109 |
| 3,982,789 | 9/1976 | Funk ................................. 406/105 |
| 4,114,955 | 9/1978 | Araoka .............................. 406/98 |
| 4,227,863 | 10/1980 | Sommerer ....................... 417/171 X |

Primary Examiner—Clifford D. Crowder
Attorney, Agent, or Firm—William J. Miller

[57] ABSTRACT

A method and apparatus for injecting a low pressure slurry into a high pressure stream to form a high pressure slurry by injecting a high pressure fluid into a chamber. A portion of the high pressure fluid is removed at a certain location in the chamber, to form a fluid low pressure vortex. The low pressure slurry is injected into the low pressure vortex where it mixes with the high pressure fluids. The slurry, at a high pressure, is removed from a high pressure outlet.

29 Claims, 9 Drawing Figures

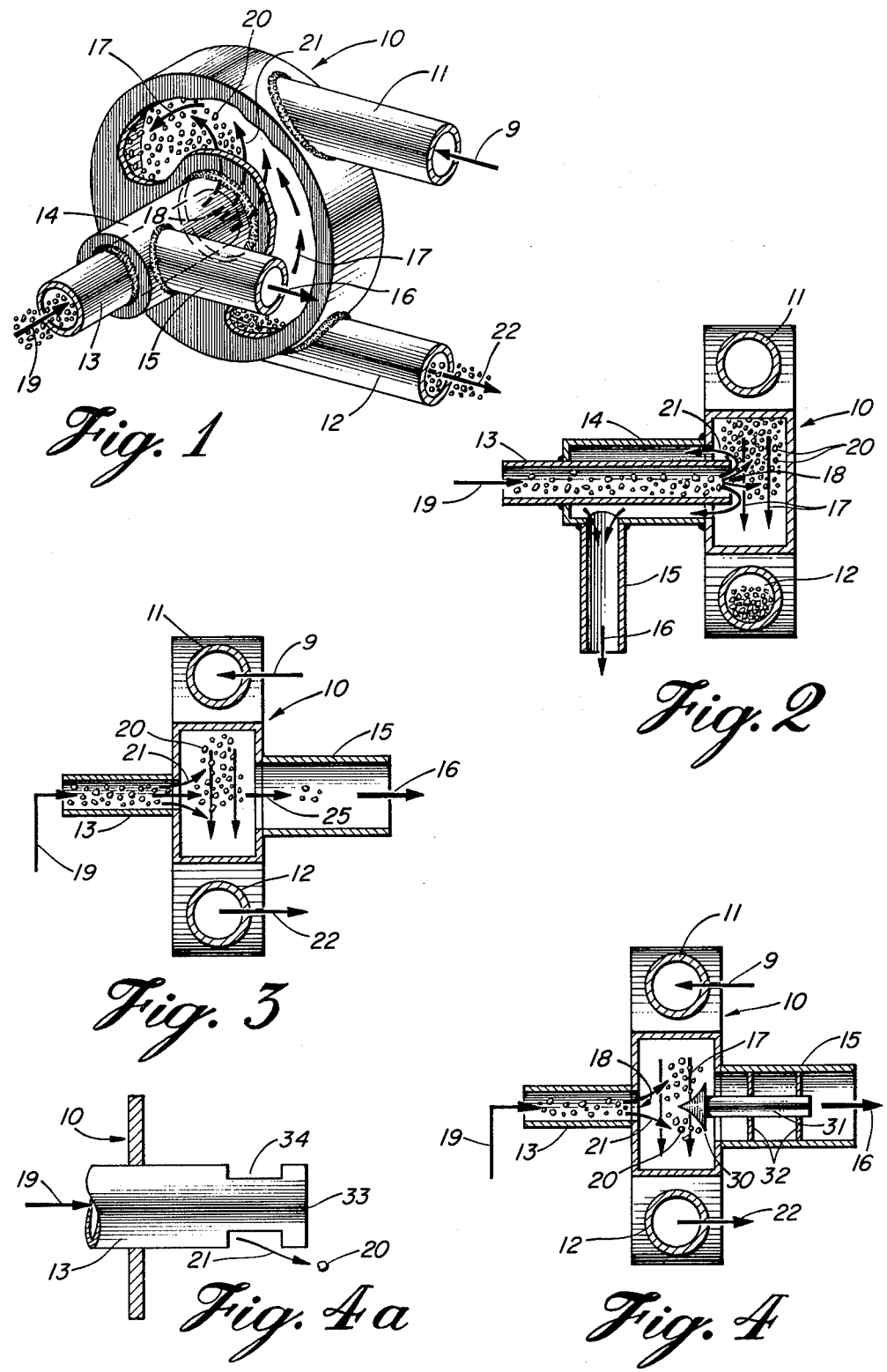

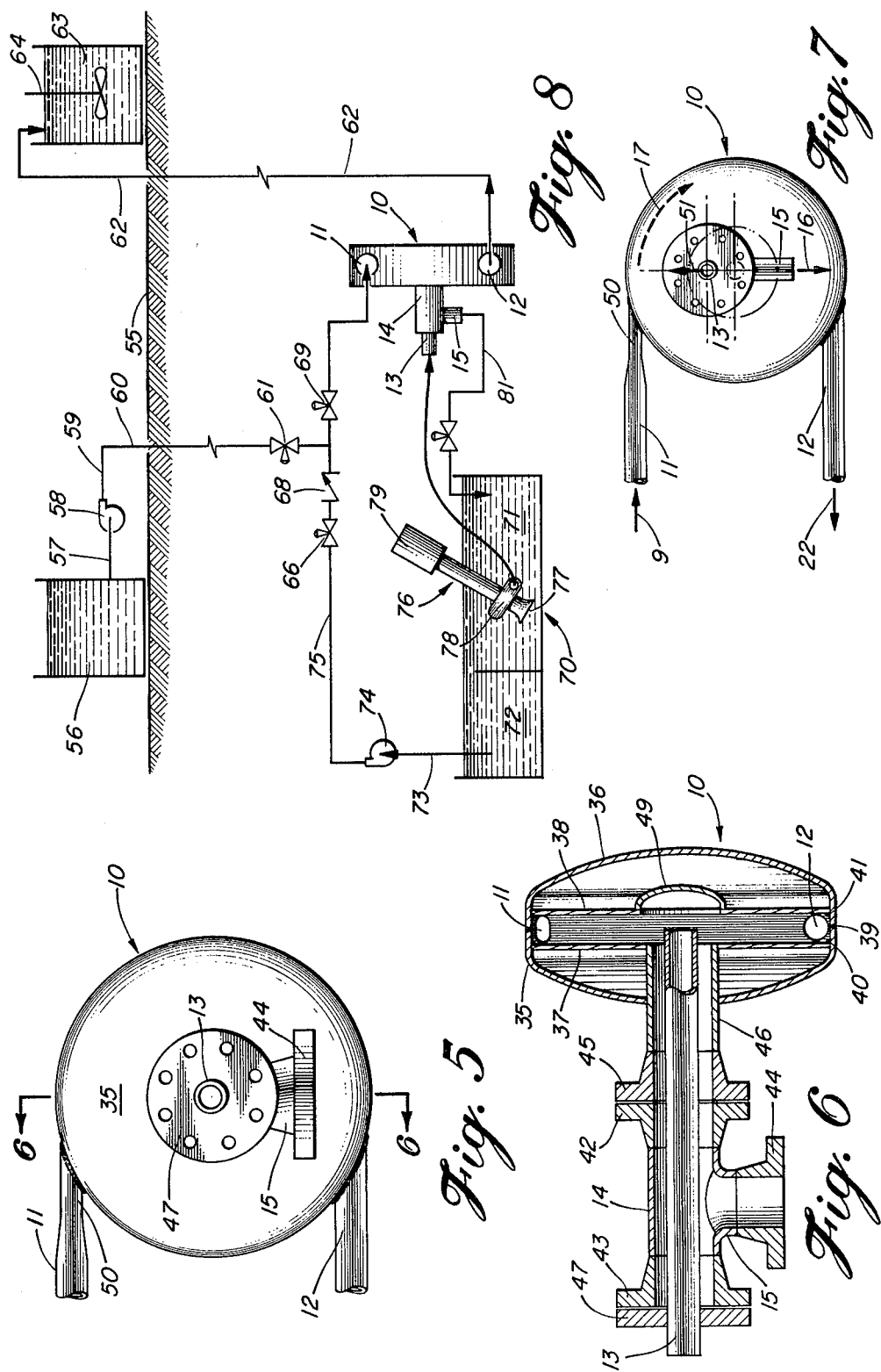

VORTEX INJECTION METHOD AND APPARATUS

BRIEF DESCRIPTION OF THE PRIOR ART

Considerable effort has been spent in the past to develop a means for injecting low pressure solids into a system under a high pressure. Systems in the past have mostly utilized a batch type operation where low pressure solids or slurry are put into a chamber and then high pressure water is used to force slurry out of the chamber. Such a system is clearly illustrated in the patent to Edward D. Funk, U.S. Pat. No. 3,982,789. A newer system which provides a more continuous operation is illustrated in U.S. Pat. No. 4,114,955 to Toshinobu Araoka. In that patent a U-shaped mixing chamber is provided which has an impeller mounted in it. The rotation of the impeller causes mixing of the fluid which is injected at the center of the chamber. Slurries tend to create extreme wear on an impeller type apparatus. Thus, the system which is described in either of the above referenced patents causes a high wear on the chambers or impellers, and thus, creates a high degree of maintenance necessary to keep the mixing apparatus operating.

BRIEF DESCRIPTION OF THE INVENTION

This invention comprises a vortex injection apparatus which has a housing of substantially circular cross section. High pressure fluid, such as water, is injected tangentially into the housing with an exit for the high pressure fluid also provided on a tangent to the housing. Low pressure slurry is injected into the housing at a vortex created by both rotating fluids in the housing and a low pressure outlet. The vortex provides a low pressure zone where slurry can be added. The slurry particles will move to the outer wall where they are mixed with the high pressure rotating fluid and ejected from the chamber at the high pressure outlet.

BRIEF DESCRIPTION OF THE FIGURES

FIG. 1 is an orthogonal projection of the mixing chamber illustrating the inlet and the outlet for high pressure fluid, along with the preferred inlet and outlet arrangement for the low pressure fluid or slurry;

FIG. 2 is a cross sectional view of the apparatus illustrated in FIG. 1;

FIG. 3 is a partially cut-a-way view illustrating one embodiment of the invention;

FIG. 4 is a modified form of the apparatus illustrated in FIG. 3;

FIG. 4A is a slightly modified arrangement for the deflection plate illustrated in FIG. 4;

FIG. 5 is an end view of one actual embodiment constructed in accordance with the teachings of this invention;

FIG. 6 is a cross sectional view of the embodiment shown in FIG. 5 taking through line 6—6 of FIG. 5;

FIG. 7 is a side view of the invention illustrating the placement of the low pressure inlet and outlet; and FIG. 8 illustrates a method for using the vortex injector.

Referring to all of the drawings, but particularly to FIGS. 1 and 2, a vortex chamber generally referred to by chamber 10 has a high pressure inlet 11 and a high pressure outlet 12. Inlet 11 and outlet 12 are connected to chamber 10 in a manner so that the axis of inlet 11 will be normal to a diameter taken through the center of chamber 10. A low pressure inlet is provided by a pipe 13 which is co-axially aligned with a pipe 14 which provides a low pressure fluid exit through a pipe 15 as illustrated by arrow 16.

The operation of the device shown in FIGS. 1 and 2 is as follows: high pressure fluids, such as water, will enter in the direction of arrow 9 and move around the inside of the vortex chamber as illustrated by arrow 17. As the fluid moves around vortex chamber 10 in the direction of arrow 17, and as a portion of the fluid exits out low pressure pipe 14 to outlet pipe 15, the fluids will form a vortex approximately along the axis of pipe 13 as illustrated by arrow 18. The vortex at arrow 18 will be substantially reduced in pressure. Thus, solids and liquids entering along arrow 19 through low pressure pipe 13 can enter directly into the vortex region 18 without requiring any boosting of pressure by means of a pump. As the slurry along arrow 19 enters the vortex region 18, the particles of material, such as coal 20, will move along a path 21. As a result, the particles of materials, such as coal 20, will move to the outer edge of vortex chamber 10 and pass out of high pressure exit 12 in the direction of arrow 22. Since fluids are entering the low pressure inlet 13 along with the particles, and fluids are moving from high pressure inlet 11 to the low pressure outlet 15 to form the low pressure vortex, fluid will be passing out of pipe 15 in the direction of arrow 16. The fluids passing out pipe 15 can be disposed of in one of several ways which will be discussed in a subsequent portion of the specification.

Referring to FIG. 3, a modified version of the apparatus shown in FIGS. 1 and 2 is illustrated. In this figure the basic apparatus is identical to that illustrated in FIGS. 1 and 2 with chamber 10 having inlet and outlet 11 and 12 respectively with a low pressure inlet 13 and a low pressure outlet 15. The major difference between the apparatus shown in FIG. 3 as compared with FIG. 1, is the outlet pipe 15. Rather than being coupled to a co-axial pipe 14, outlet pipe 15 is coupled to vortex chamber 10 at the vortex and at the opposite side from inlet pipe 13. Inlet pipe 13 is preferably of smaller diameter than outlet pipe 15 in order to maintain the lowest pressure at the inlet so that fluids will not attempt to enter pipe 13.

The efficiency of the apparatus illustrated in FIG. 3 is not as high as that illustrated in FIG. 1 since slurry entering along arrow 19 will not only move in the direction of arrow 21 as previously described in FIGS. 1 and 2, but also some material will pass completely along the vortex in the direction of arrow 25. Material 20 will then pass into the low pressure fluid outlet 15 thereby reducing the efficiency of the overall operation.

The problem illustrated in FIG. 3 can be somewhat avoided by modifying the structure of FIG. 3 to include a baffle plate 30 which is supported through a structure 31 which is attached in turn to a bracket or other arrangement 32 to pipe 15. Baffle plate 30 can also be attached in other ways; for example, to the inside of chamber 10 or even to the inside of pipe 13. The main criteria is that the supporting structure for baffle 13 receive as little frictional wear from the material 20 as possible and not impede the rotational movement 17 of fluid of the vortex 18. Thus, as low pressure fluid 19 passes through inlet pipe 13, the fluid will travel in the direction of arrow 21. However, rather than moving directly to pipe 15, the fluid and material will strike baffle plate 30, deflecting material 20 in a direction so that it will be caught up by the rotating fluid illustrated by arrow 17.

A modified version of the baffle plate 30 is illustrated in FIG. 4A, in that case pipe 13 is terminated by an end plate 33 and has a plurality of slots 34 formed therein. End plate 33 will function exactly as baffle 30 in FIG. 4 while the slots 34 will permit the passage of slurry to chamber 10 and fluid to the low pressure outlet pipe 15.

An actual embodiment has been constructed in accordance with the teachings of this invention and as illustrated in FIGS. 5 and 6. The vortex chamber 10 is constructed of the two bell shaped members 35 and 36 with inner disc members 37 and 38. Members 35 and 36 are welded together at a point 39 and disc members 37 and 38 are welded together at their edges 40 and 41. Coaxial pipe 14 is formed by a T-shaped pipe having flanges 42, 43 and 44 welded to it. A flange 45 is welded to a short section of pipe 46 to bell shaped member 35 and to disc shaped member 37. The flanges 42 and 45 are bolted together in the usual manner. Inlet pipe 13 is attached to a flange 47 and bolted to flange 43. A smaller bell shaped member 49 is welded to disc member 38. In order to transfer pressure from the discs 37 and 38 to the bell shaped members 35 and 36, respectively, the space between the disc and bell shaped member can be filled with fluid, solid material, or can be ribbed.

One modification of the apparatus illustrated in FIGS. 5 and 6 over that previously described, is the reduction 50 in high pressure inlet pipe 11. The reduction in the diameter of the inlet pipe increases the velocity of the fluid as it enters vortex chamber 10. It is obvious that the diameter of the pipe can be varied from the actual diameter of inlet pipe 11 to a size substantially smaller depending upon the velocity desired inside vortex chamber 10. If the velocity at inlet pipe 11 is substantially increased, then the efficiency of the unit can be improved by injecting the low pressure solid liquid slurry at inlet 13 at a slightly different location than the axial center of vortex chamber 10.

In order to improve the efficiency and referring to FIG. 7, a modification of the above is illustrated. If the velocity is increased as shown by reducing inlet pipe 11 at region 50, then the vortex injection point should be moved toward the inlet or outlet which has been increased in velocity. That is, the vortex injection point should be shifted along arrow 51 in the manner illustrated in FIG. 7.

The operation of the device illustrated in FIGS. 5, 6 and 7 is substantially identical to that previously described.

In the preferred embodiment illustrated in any of the preceding figures, the width of the chamber should be approximately the same as the width of the high pressure inlet 11 or outlet 12, whichever is the larger, for the best efficiency for the vortex injector.

PROCESS FOR UTILIZING THE APPARATUS

FIG. 8 illustrates one process where the vortex injection apparatus is used. The particular use contemplated in FIG. 8 is that of a means for hoisting slurry from a mine to the surface of the earth. Referring to FIG. 8, an earth's surface 55 has a water reservoir 56 mounted on it. The water reservoir can be filled from any source such as for example the water separation from a processing plant where the water separated from solids can be returned and emptied into reservoir 56. Water is then removed from reservoir 56 through pipe 57 and pumped through a pump 58 to a second water pipe 59 which is then transferred down a vertical pipe 60 to control valve 61. Valve 61 is coupled through a control valve 69 which controllably applies water to the inlet 11 of vortex injection apparatus vortex chamber 10. The outlet 12 supplies high pressure slurry up a vertical pipe 62 which empties into a slurry storage tank 63. Material is normally maintained in a suspension by a stirring apparatus 64. The slurry contained in tank 63 is continually transferred to a processing plant where the water is removed and the coal is processed in the usual manner. The water that is removed or separated is then clarified and returned to tank 56 as previously described. In the mine a sump 70 contains, in one portion, a place for the storage of slurry 71 and a place for the storage of water 72. Water is removed from the water end 72 through a pipe 73, to a pump 74, conduit 75, to control valve 66, to check valve 68 and to control valve 69. Coal is continually removed from the slurry portion 71 of sump 70 by a dredge apparatus generally referred to by arrow 76. Dredge apparatus contains a suction end 77, a pump 78 and a motor 79 which drives pump 78. The coal is generally sucked up through suction portion 77 by a means of pump 78 and transferred up a pipe 80 to low pressure inlet 13. Water from low pressure outlet 15 is conveyed through pipe 81 and control valve 82 to the sump portion 71.

The operation of this system is as follows: normally sump 70 is filled with water at end 72 and a coal/water slurry at end 71. Excess water will run over into portion 72 filling it. The distance between surface 55 and sump 70 can be anywhere from 100 feet to 1,000 feet under normal conditions. Thus, whenever the material from sump 70 is to be moved to the surface, the pressure of the fluid must be sufficient at outlet pipe 12 to lift the slurry being sucked up by pump 78 so that it will pass up conduit 62 and into reservoir 63. In order to accomplish this in the past, a series of slurry pumps were installed in the mine in the neighboring location of sump 70. To move slurry pumps of the size necessary to lift the slurry vertically to the surface of the earth 55 requires considerable effort, a large space, overhead cranes for maintenance and complex electrical circuits to drive and operate the pumps, all of which must operate in an extremely difficult environment, and all must be maintained in a manner so that the mine environment will not be subject to fires, explosions, spillages or such problems generally caused by large equipment being confined in a small space in a region of the mine. The vortex injector disclosed in this invention eliminates the need for the series of slurry pumps necessarily present in a slurry transportation system in the mine. The only pumps needed are water pump 74 and the dredge pump 78 which are much more compact and easily available. The coal/water slurry is picked up by pump 78 and transferred through conduit 80 to the low pressure inlet 13 of vortex injector 10. The high pressure water which was pressured by reservoir 56, pump 58 and conduit 60 is applied to the high pressure inlet 11 of vortex injector 10. The head between pump 58 and the inlet 11 of vortex injector 10 is almost identical to the head between vortex injector outlet 12 and the slurry reservoir 63. Thus, the only additional water, under pressure, that must be provided is the make up water being applied through control valves 66 and 61 through pipe 75 to the inlet 11 of injector 10. Control valve 82 maintains a desired head pressure for pump 78.

As discussed in the previous figures, the low pressure vortex is developed by fluids entering high pressure inlet 11 and out high pressure outlet 12 with a portion of the fluid passing out the low pressure outlet 15. Without fluids passing out outlet 15, the pressure at the vortex would be substantially the same as the pressure at inlet 11. The loss of water, however, from outlet 15 must be made up. The make up water is provided by removing water from sump 72 by pump 74 which must increase the pressure in pipe 75 to the pressure at inlet 11. Make up water is then applied to high pressure inlet 11 by opening control valves 68 and 61.

If excess water accumulates during operation, valve 69 can be partially or wholly closed to remove water from sump 70.

CONCLUSIONS

A method and apparatus have been disclosed which substantially reduces the equipment necessary in a slurry transportation system in a mine. The apparatus essentially comprises a vortex injector which accepts a high pressure fluid at its inlet and generates the high pressure at its outlet. A low pressure inlet mixes the water slurry from a sump and applies the water slurry to a vortex inside the vortex injector. The slurry will move to the outside where it will be picked up by the circulating water within the vortex chamber 10. The material will pass out the outlet and be conveyed to the surface of the earth. The vortex injector has been specifically disclosed and its use specifically disclosed with respect to a coal transportation system, particularly one useful in a mine. It is obvious the vortex injector can be used whenever a low pressure material needs to be mixed with a high pressure fluid and the invention is not so limited as to be specific to a particular use disclosed herein.

It is obvious that changes and modifications can be made in the particular device described and still be well within the scope of the invention as set out in the specification and appended claims.

What I claim is:

1. A vortex injection apparatus comprising:
   (a) a housing having a sidewall in a substantially circular cross section normal to its vertical axis including means for enclosing said sidewalls to form a chamber;
   (b) high pressure fluid inlet means formed into said sidewall wherein the axis of said inlet means is normal to a diameter of said sidewall;
   (c) high pressure fluid outlet means formed into said sidewall wherein the axis of said outlet means is normal to a diameter of said sidewall;
   (d) low pressure inlet means formed through said enclosing means; and
   (e) low pressure outlet means formed through said enclosing means:
   whereby when high pressure fluid is injected into said chamber so that a portion of said high pressure fluid moves to said low pressure outlet and a portion moves to said high pressure outlet, a low pressure vortex will form wherein low pressure fluid at said low pressure inlet may be injected.

2. Apparatus as described in claim 1 wherein said low pressure inlet means is aligned axially with said vortex.

3. Apparatus as described in claim 1 or 2 wherein the axis of both said high pressure fluid inlet means and said high pressure fluid outlet means is normal to the same diameter.

4. Apparatus as described in claim 1 wherein said low pressure inlet means is displaced from said vortex axis toward the high pressure inlet or outlet means having the highest velocity.

5. Apparatus as described in claims 1, 2 or 4 wherein said low pressure outlet means is mounted to said enclosing means co-axial with said low pressure inlet means.

6. Apparatus as described in claims 1, 2 or 4 wherein said enclosing means comprises a top and a bottom and wherein said low pressure inlet and outlet means are mounted co-axially to said bottom.

7. Apparatus as described in claim 1 wherein said enclosing means comprises first and second ends and wherein said low pressure inlet is mounted through one end and said low pressure outlet is mounted co-axially through said remaining end.

8. Apparatus as described in claim 7 including a deflection plate mounted in said chamber and positioned along and normal to the axis of said low pressure outlet means.

9. A vortex injection apparatus comprising:
   (a) a chamber having a substantially circular cross section and an axis normal to said circular cross section;
   (b) first inlet means through said chamber periphery, said inlet means axis normal to a diameter of said circular cross section;
   (c) first outlet means through said chamber periphery, said outlet means axis normal to a diameter of said circular cross section;
   (d) second inlet means through said chamber substantially co-axially aligned with said chamber; and
   (e) second outlet means through said chamber substantially co-axially aligned with said chamber: whereby high pressure fluid will enter said first inlet means to said chamber at a tangent to said chamber periphery and wherein a portion of said high pressure fluid will flow not only to said high pressure outlet but also to said low pressure outlet forming a low pressure vortex at said chamber axis, material will enter said second inlet means mixing with fluid from said first inlet means at said vortex and exit with said fluid at said first outlet means.

10. Apparatus as described in claim 9 wherein said second inlet means is aligned axially with said vortex.

11. Apparatus as described in claim 9 or 10 wherein the axis of said first inlet means and first outlet means is tangent to the same diameter.

12. Apparatus as described in claim 9 wherein said second inlet means is displaced from said substantially co-axially alignment toward the first inlet or outlet means having the highest velocity.

13. Apparatus as described in claims 9, 10 or 12 wherein said second outlet means is through said chamber co-axially aligned with said second inlet means.

14. Apparatus as described in claims 9, 10 or 12 wherein said chamber includes an end plate means and wherein both said second outlet and second inlet means are mounted co-axially to said end plate means.

15. Apparatus as described in claim 9 wherein said chamber comprises sidewalls and first and second ends: wherein said second inlet is mounted co-axially with said chamber through one end and wherein said second outlet is mounted through said remaining end co-axial with said chamber.

16. Apparatus as described in claim 15 including a deflection plate means mounted in said chamber and positioned along and normal to the axis of said second outlet means.

17. Apparatus as described in claim 9 wherein said first inlet means has a different cross sectional area than said first outlet means.

18. A method of converting a low pressure slurry to a high pressure slurry comprising:
   (a) injecting a high pressure fluid tangentially into a generally cylindrical chamber having a central axis, thus forming a low pressure vortex;
   (b) removing a portion of said injected high pressure fluid along a path concentric to said central axis from said low pressure vortex;
   (c) injecting a low pressure slurry along said central axis into said low pressure vortex wherein said low pressure slurry mixes with said high pressure fluid to form a high pressure slurry;
   (d) separately removing said formed high pressure slurry tangentially from said chamber.

19. A method as described in claim 18 wherein said low pressure slurry is a mixture of coal and water.

20. A method as described in claim 18 additionally comprising:
   (a) forming a sump for the storage of slurry;
   (b) removing slurry from said sump for injection into said vortex;
   (c) conveying said removed low pressure fluid to said sump for storage.

21. A method as described in claim 20 wherein said slurry is a mixture of coal and water.

22. A method for converting a low pressure slurry in a mine to a high pressure slurry for hoisting out of said mine comprising:
   (a) injecting a high pressure fluid from the surface of the earth tangentially into a chamber located at a depth below the surface of the earth in a mine;
   (b) removing a portion of said injected high pressure fluid from said chamber to form a low pressure vortex;
   (c) injecting a low pressure slurry formed from a source located in said mine, into said low pressure vortex wherein said low pressure slurry mixes with said high pressure fluid to form a high pressure slurry;
   (d) removing said high pressure slurry from said chamber;
   (e) conveying said high pressure slurry to the surface of said earth;
   (f) conveying said removed fluid to said source in said mine; and
   (g) pumping fluid from said source in said mine along with said injected high pressure fluid into said chamber.

23. A method as described in claim 22 wherein said slurry is a mixture of coal and water.

24. A method as described in claim 22 additionally comprising injecting additional high pressure fluid from said mine source in combination with said high pressure fluid from said surface of the earth.

25. An article of manufacture comprising:
   (a) a chamber having an axis with a substantially circular cross section taken normal to said axis, and sidewalls;
   (b) a first inlet mounted through said sidewall with the axis of said inlet substantially normal to a diameter on said circular cross section;
   (c) a first outlet mounted through said sidewall with the axis of said first outlet substantially normal to a diameter on said circular cross section;
   (d) a second inlet mounted through said chamber and aligned substantially co-axial with the axis of said chamber;
   (e) a second outlet mounted through said chamber and aligned substantially co-axial with the axis of said chamber.

26. An article of manufacture as described in claim 25 wherein said second outlet has a larger inside diameter than said second inlet.

27. An article of manufacture as described in claim 25 wherein said first inlet and said first outlet are normal to the same diameter.

28. An article of manufacture as described in claim 27 wherein said second outlet has a larger inside diameter than said second inlet.

29. An article of manufacture as described in claim 25, or 27 wherein the width along the axis of said chamber is substantially the same as the diameter of said first inlet or first outlet whichever is larger.

* * * * *